United States Patent
Bailey

(10) Patent No.: US 8,789,616 B2
(45) Date of Patent: Jul. 29, 2014

(54) APPARATUS AND METHOD FOR INHIBITING PROPAGATION OF A FLAME FRONT

(75) Inventor: Christopher Mark Bailey, Horsham (GB)

(73) Assignee: Edwards Limited, Crawley, West Sussex (GB)

( * ) Notice: Subject to any disclaimer, the term of this patent is extended or adjusted under 35 U.S.C. 154(b) by 1620 days.

(21) Appl. No.: 11/989,314

(22) PCT Filed: Jul. 17, 2006

(86) PCT No.: PCT/GB2006/050210
§ 371 (c)(1),
(2), (4) Date: Aug. 3, 2009

(87) PCT Pub. No.: WO2007/012894
PCT Pub. Date: Feb. 1, 2007

(65) Prior Publication Data
US 2009/0301740 A1  Dec. 10, 2009

(30) Foreign Application Priority Data
Jul. 25, 2005 (GB) .................................. 0515155.0

(51) Int. Cl.
*A62C 2/00* (2006.01)
(52) U.S. Cl.
USPC ................ 169/43; 417/292; 417/289; 169/48
(58) Field of Classification Search
USPC ................ 169/49, 69, 56, 60, 61, 45, 46, 64; 48/192; 137/79, 80; 156/345.27; 431/3, 431/29, 30, 31, 346
See application file for complete search history.

(56) References Cited

U.S. PATENT DOCUMENTS

| | | | | |
|---|---|---|---|---|
| 824,935 A | * | 7/1906 | Jenczewsky | ..................... 137/76 |
| 3,941,349 A | * | 3/1976 | Pierson | ......................... 251/100 |
| 4,246,002 A | * | 1/1981 | Bell | ................................ 48/192 |

(Continued)

FOREIGN PATENT DOCUMENTS

| EP | 0 435 477 B1 | 4/1995 |
|---|---|---|
| EP | 1 039 187 A2 | 9/2000 |

(Continued)

OTHER PUBLICATIONS

United Kingdom Search Report of Application No. GB 0515155.0; Claims searched: 1-18; Date of search: Nov. 23, 2005.

(Continued)

*Primary Examiner* — Len Tran
*Assistant Examiner* — Viet Le
(74) *Attorney, Agent, or Firm* — Westman, Champlin & Koehler, P.A.

(57) ABSTRACT

Apparatus and a method are provided for inhibiting the propagation of a flame front that is ignited by a pumping mechanism which draws a waste stream from a process chamber. The apparatus comprises a foreline for conveying the waste stream which is drawn from the process chamber to the pumping mechanism. The foreline comprises an isolation valve for selectively isolating the pumping mechanism from the process chamber and a bypass positioned around the isolation valve. The apparatus further comprises a controller for actuating the isolation valve. The controller is configured to cause the isolation valve to be closed when the waste stream is initially drawn from the process chamber. During which time the waste stream is conveyed to the pumping mechanism via the bypass, the bypass comprises means for inhibiting propagation of a flame front therethrough. The controller is also configured to cause the isolation valve to be opened once a pressure within a region upstream of the isolation valve has been reduced below a value at which propagation of a flame front within the waste stream can be sustained.

12 Claims, 2 Drawing Sheets

(56) References Cited

U.S. PATENT DOCUMENTS

| | | | |
|---|---|---|---|
| 4,682,936 A | 7/1987 | Suzuki et al. | |
| 6,202,667 B1 | 3/2001 | Chen | |

FOREIGN PATENT DOCUMENTS

| | | | |
|---|---|---|---|
| FR | 2 618 341 A1 | | 1/1989 |
| GB | 2 049 823 A | | 12/1980 |
| GB | 2049823 A | * | 12/1980 |
| GB | 2 115 110 A | | 9/1983 |
| GB | 2 391 265 A | | 2/2004 |
| JP | 2001037902 A | | 2/2001 |

OTHER PUBLICATIONS

PCT Notification of Transmittal of the International Search Report and the Written Opinion of the International Searching Authority, or the Declaration of International Application No. PCT/GB2006/050210; Date of mailing: Nov. 2, 2006.

PCT International Search Report of International Application No. PCT/GB2006/050210; Date of mailing of the International Search Report: Nov. 2, 2006.

PCT Written Opinion of the International Searching Authority of International Application No. PCT/GB2006050210; Date of mailing: Nov. 2, 2006.

Prosecution history for corresponding Chinese Application No. 200680026770.7 including: Office Action dated Jul. 15, 2010; Response dated Oct. 26, 2010.

Prosecution history for corresponding Korean Application No. 2008-7001962 including: Notice of Preliminary Rejection dated Oct. 26, 2010; Response dated Aug. 12, 2013; Notice of Final Rejection dated Jul. 2013; Response dated Mar. 19, 2013.

* cited by examiner

APPARATUS AND METHOD FOR INHIBITING PROPAGATION OF A FLAME FRONT

FIELD OF THE INVENTION

This invention relates to apparatus for inhibiting the propagation of a flame front ignited by a pumping mechanism drawing a waste stream from a process chamber following a restart of the pumping mechanism.

BACKGROUND OF THE INVENTION

As semiconductor processes become increasingly sophisticated, the fluids used in these processes are becoming increasingly aggressive. There is an increasing risk associated with these processes that the atmosphere within a vacuum pump used to evacuate the process chamber may comprise pockets of flammable gas or, in the extreme, may be entirely flammable. Conventionally, vacuum pumps have not been designed with such environments in mind. A vacuum pumping mechanism typically comprises a metal rotor cooperating with a metal stator to convey fluid from an inlet of the vacuum pump to an outlet thereof. These components of the pumping mechanism are required to have a close tolerance so that fluid being pumped is inhibited from leaking back towards the inlet of the pump. The proximity of these two metal components is, by its very nature, inclined to represent an ignition source as any clashing of components may generate a spark. Given the aggressive nature of the processes being undertaken by these pumps, deformation of the metal components (through corrosion) is increasingly likely, so that these tolerances may be significantly reduced. Furthermore, the reactions of materials used in semiconductor processes often lead to a deposition of materials on the surfaces of the rotor and the stator. These deposits further reduce the clearances such that the alignment of the components of the pumping mechanism may be affected and clashing of the metal components may result. In addition, the deposits formed on the surfaces of the rotors and the stator may become an ignition source, for example if they are heated by friction resulting from the increased contact due to the reduced clearances.

In the event that a flammable atmosphere comes into contact with an ignition source an explosion may result. If this explosion leads to damage of the apparatus safety issues are likely to be raised. A catastrophic breach of integrity may cause projectiles to be formed from the components of the pump, creating a hazardous environment to any other equipment in the vicinity and ultimately to any personnel located in the area. If such a breach is less abrupt, leakage of flammable gas may occur into the environment surrounding the apparatus, and so if further ignition sources are available in this area, there may be a risk of further explosion. Depending on the extent of any damage caused by the explosion, the entire pumping arrangement may need to be taken out of service to permit maintenance to be undertaken. The down time for the overall process system associated with this unplanned maintenance typically results in a loss of production.

As discussed above, during operation a vacuum pumping mechanism may provide an ignition source for a flammable gas mixture. Consequently, in the event that the pumping mechanism of a vacuum pump connected to a process chamber becomes engulfed in a flammable gas mixture prior to initiation of operation of the vacuum pump, it is possible that the subsequent motion of the pumping mechanism could result in an explosion. Such an explosion could propagate back through the inlet of the pump towards the process chamber.

It is an aim of at least the preferred embodiments of the present invention to minimise the hazardous potential of such an explosion.

SUMMARY OF THE INVENTION

In a first aspect the present invention provides apparatus for inhibiting the propagation of a flame front ignited by a pumping mechanism drawing a waste stream from a process chamber, the apparatus comprising:

a foreline for conveying the waste stream drawn from the process chamber to the pumping mechanism, the foreline comprising an isolation valve for selectively isolating the pumping mechanism from the process chamber and a bypass around the isolation valve; and a controller for actuating the isolation valve, wherein the controller is configured to:

cause the isolation valve to be closed when the waste stream is initially drawn from the process chamber so that the waste stream is conveyed to the pumping mechanism via the bypass, the bypass comprising means for inhibiting propagation of a flame front therethrough; and cause the isolation valve to be opened when a pressure within a region upstream of the isolation valve has been reduced below a value at which propagation of a flame front within the waste stream can be sustained.

A second aspect of the present invention provides a vacuum pumping arrangement comprising a vacuum pump and any of the aforementioned apparatus for inhibiting the propagation of a flame front ignited by the vacuum pump towards a process chamber connected to an inlet of the vacuum pump.

A third aspect of the present invention provides a method for inhibiting the propagation of a flame front ignited by a pumping mechanism drawing a waste stream from a process chamber, the method comprising the steps of:

providing a foreline for conveying the waste stream drawn from the process chamber to the pumping mechanism, the foreline comprising an isolation valve for selectively isolating the pumping mechanism from the process chamber and a bypass around the isolation valve;

closing the isolation valve when the waste stream is initially drawn from the process chamber so that the waste stream is conveyed to the pumping mechanism via the bypass, the bypass comprising means for inhibiting propagation of a flame front therethrough; and opening the isolation valve when a pressure within a region upstream of the isolation valve has been reduced below a value at which propagation of a flame front within the waste stream can be sustained.

An evacuated region may be generated as the waste stream is drawn through the bypass. A fourth aspect of the present invention provides a method of inhibiting the propagation of a flame front ignited by a pumping mechanism drawing a waste stream from a process chamber, the method comprising the steps of:

isolating the pumping mechanism from the process chamber using an isolation valve;

providing a bypass around the isolation valve;

initially drawing the waste stream through the bypass to generate within a flow path from the process chamber to the pumping mechanism an evacuated region that inhibits propagation of a flame front from the pumping mechanism to the process chamber; and when a pressure upstream of the isolation valve has been reduced below a value above which propagation of a flame front within the waste stream can be sustained, opening the isolation valve.

BRIEF DESCRIPTION OF THE DRAWINGS

The invention is described below in greater detail, by way of example only, with reference to the accompanying drawings, in which.

DETAILED DESCRIPTION OF THE INVENTION

Figure 2:
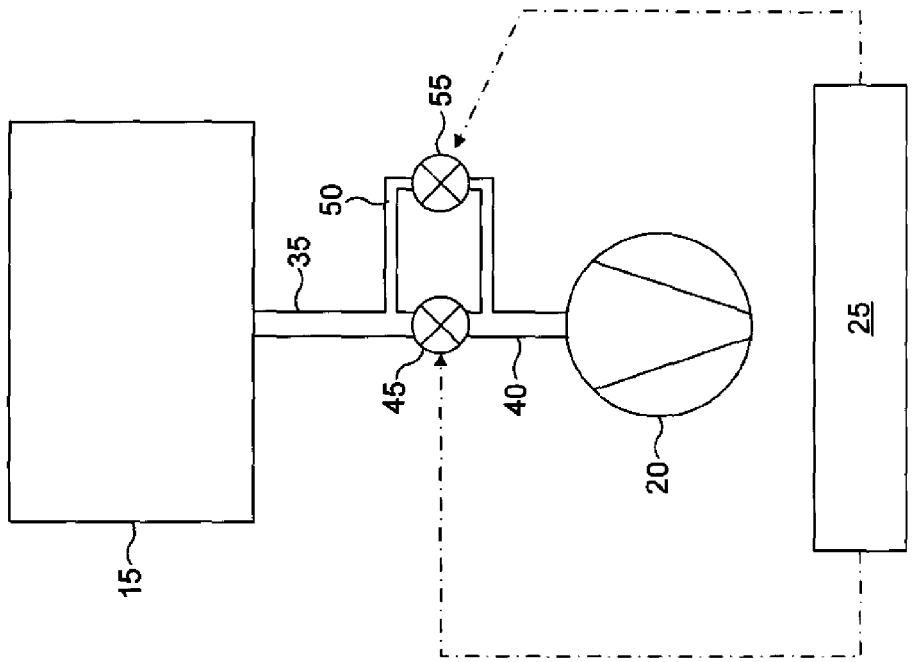
FIG. 2 illustrates a vacuum pumping arrangement comprising a second embodiment of an apparatus for inhibiting propagation of a flame front.

In a first aspect the present invention provides apparatus for inhibiting the propagation of a flame front ignited by a pumping mechanism drawing a waste stream from a process chamber, the apparatus comprising: a foreline for conveying the waste stream drawn from the process chamber to the pumping mechanism, the foreline comprising an isolation valve for selectively isolating the pumping mechanism from the process chamber and a bypass around the isolation valve; and a controller for actuating the isolation valve, wherein the controller is configured to: cause the isolation valve to be closed when the waste stream is initially drawn from the process chamber so that the waste stream is conveyed to the pumping mechanism via the bypass, the bypass comprising means for inhibiting propagation of a flame front therethrough; and cause the isolation valve to be opened when a pressure within a region upstream of the isolation valve has been reduced below a value at which propagation of a flame front within the waste stream can be sustained.

During the initial stage of evacuation, the waste stream is drawn through the bypass. As the bypass comprises inhibiting means for inhibiting propagation of a flame front, there is a reduced risk of any deflagration propagating back towards the process chamber. The inhibiting means causes a pressure within the region between the bypass and the pumping mechanism to be below a value at which the propagation of a flame front within the waste stream can be sustained.

Evacuation through the bypass, and consequently through the inhibiting means, is significantly slower than when the waste stream is conveyed directly through the foreline when the isolation valve is open, due to the increased level of obstructions experienced by the waste stream. Moreover, processes producing flammable gas mixtures are often "dirty" processes that result in high levels of materials being deposited on any surfaces downstream of the process chamber. For each of these reasons it is desirable to minimise the duration of the passage of the waste stream through the bypass. Therefore, once the pressure in the apparatus upstream of the isolation valve has reduced below a value at which propagation of a flame front within the waste stream can be sustained, the isolation valve is opened so the waste stream may pass directly from the process chamber to the pumping mechanism without necessarily passing through the bypass. Propagation of a flame front is now inhibited by the fact that the pressure upstream of a potential ignition source, for example the pumping mechanism of the vacuum pump, is reduced below a value so that propagation of a flame front could be sustained.

The inhibiting means may be provided as a separate component or mechanism located within the bypass. For example, the inhibiting means may comprise a flame arrester element and/or valve. If a valve is used, it may be a valve having a variable restriction element for effecting a variable restriction to the flow of a waste stream therethrough. However, the inhibiting means may be provided by altering the configuration of the bypass itself. For example, the dimensions or the trajectory of the bypass may be designed to inhibit propagation of any incident flame front. The bypass may be configured to have an internal cross sectional dimension smaller than that of the foreline to restrict flow of the waste stream therethrough.

Alternatively, or additionally, the bypass may be configured such that it comprises one or more convolutions. The inhibiting means may be provided by forming a restriction to the flow within the bypass using either a valve or by providing a bypass with a smaller diameter bore. For example, for a vacuum pump with a pumping speed of 1000 m$^3$/hr may use a bypass having an open area of approximately 7 mm$^2$. The isolation valve may comprise a gate valve.

If the inhibiting means is provided by valve means, the controller may be configured to cause the valve means to be closed prior to operation of the pumping mechanism, and to be opened when a pressure within a region between the valve means and the pumping mechanism has been reduced below a value at which propagation of a flame front within the waste stream can be sustained. The controller may be configured to prevent initiation of operation of the pumping mechanism unless the valve means is closed.

A second aspect of the present invention provides a vacuum pumping arrangement comprising a vacuum pump and any of the aforementioned apparatus for inhibiting the propagation of a flame front ignited by the vacuum pump towards a process chamber connected to an inlet of the vacuum pump.

An additional vacuum pump, preferably a booster pump, may be provided between the isolation valve and the vacuum pump.

A third aspect of the present invention provides a method for inhibiting the propagation of a flame front ignited by a pumping mechanism drawing a waste stream from a process chamber, the method comprising the steps of: providing a foreline for conveying the waste stream drawn from the process chamber to the pumping mechanism, the foreline comprising an isolation valve for selectively isolating the pumping mechanism from the process chamber and a bypass around the isolation valve; closing the isolation valve when the waste stream is initially drawn from the process chamber so that the waste stream is conveyed to the pumping mechanism via the bypass, the bypass comprising means for inhibiting propagation of a flame front therethrough; and opening the isolation valve when a pressure within a region upstream of the isolation valve has been reduced below a value at which propagation of a flame front within the waste stream can be sustained.

An evacuated region may be generated as the waste stream is drawn through the bypass. A fourth aspect of the present invention provides a method of inhibiting the propagation of a flame front ignited by a pumping mechanism drawing a waste stream from a process chamber, the method comprising the steps of: isolating the pumping mechanism from the process chamber using an isolation valve; providing a bypass around the isolation valve; initially drawing the waste stream through the bypass to generate within a flow path from the process chamber to the pumping mechanism an evacuated region that inhibits propagation of a flame front from the pumping mechanism to the process chamber; and when a pressure upstream of the isolation valve has been reduced below a value above which propagation of a flame front within the waste stream can be sustained, opening the isolation valve.

The evacuated region may be generated between the pumping mechanism and the isolation valve. The pressure upstream of the isolation valve may be a pressure within a part of the foreline extending between the process chamber and the isolation valve, or it may be a pressure within the process chamber. The pressure may be monitored directly and the isolation valve may be opened in dependence on the monitored pressure. Alternatively or in addition to the direct measuring of the pressure, one or more parameters indicative of the transient pressure, for example temperature, may be monitored. The pressure may be determined from the one or more monitored parameters and the isolation valve may be opened in dependence on the determined pressure. The isolation valve may be opened after a predetermined period of time. As an alternative to measuring the local temperature, one or more of the following parameters may be monitored to give an indication of the pressure upstream of the isolation valve: pump motor power or current, flow of gas into the process chamber or a parameter related to reactions occurring within the process chamber (for example plasma reflected power or optical emissions spectrum).

A further isolation valve may be provided in the bypass. The further isolation valve may be closed prior to operation of the pumping mechanism, and opened when a pressure within a region between the further isolation valve and the pumping mechanism has been reduced below a value at which propagation of a flame front within the waste stream can be sustained.

Figure 1:
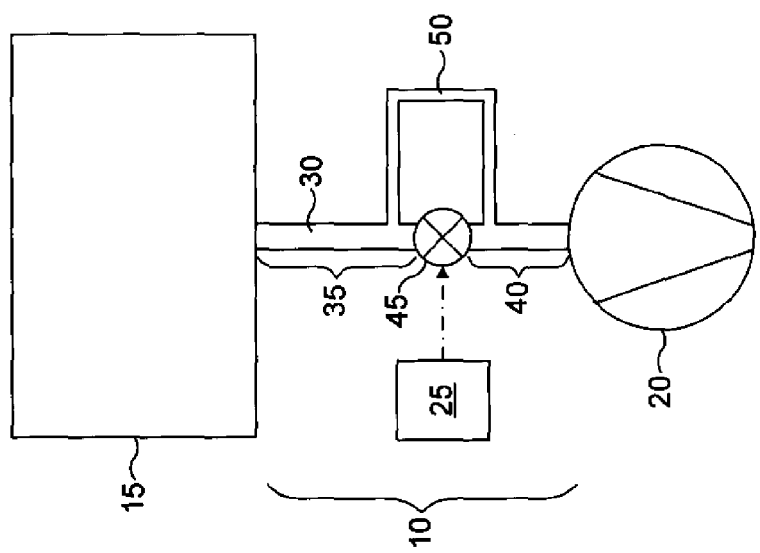
FIG. 1 illustrates a vacuum pumping arrangement comprising a first embodiment of an apparatus for inhibiting propagation of a flame front.

FIG. 1 illustrates a vacuum pumping arrangement comprising a first embodiment of an apparatus 10 for inhibiting the propagation of a flame front ignited by a pumping mechanism drawing a waste stream from a process chamber. The apparatus 10 is connected between a process chamber 15 and a vacuum pump 20 comprising a pumping mechanism and forming part of the vacuum pumping arrangement. The apparatus 10 comprises a foreline 30 for conveying the waste stream from the process chamber 15 to the vacuum pump 20. A controller 25 is provided in combination with an isolation valve 45, typically a gate valve, located within the foreline 30 for selectively arresting fluid flow. The isolation valve 45 is selectively opened and closed in response to signals received from the controller 25.

Provision of the valve 45 effectively forms two foreline portions, these being an upstream foreline portion 35 extending between the process chamber 15 and the isolation valve 45, and a downstream foreline portion 40 extending between the isolation valve 45 and the vacuum pump 30. A bypass 50 is provided around the isolation valve 45 to provide a flow path through which the waste stream is drawn from the process chamber 15 to the vacuum pump 20 when the isolation valve 45 is closed. One end of bypass 50 is connected to the upstream foreline portion 35 and the other end of bypass 50 is connected to the downstream foreline portion 40.

In the embodiment illustrated in FIG. 1, the bypass 50 is of smaller cross section than the foreline 30 to restrict the flow therethrough.

In operation, the isolation valve 45 is closed to cause the waste stream to be conveyed through the bypass 50 when the vacuum pump 20 is switched on. The smaller bore of bypass 50, when compared to the foreline 30, acts to restrict the flow of the waste stream drawn from the process chamber 15 by the vacuum pump 20. As the vacuum pump 20 draws the waste stream from the process chamber 15, the downstream foreline portion 40 is evacuated to form a region having a pressure below a particular value, $P_{crit}$, at which propagation of a flame front can be sustained therethrough, effectively creating a barrier to inhibit any such propagation. Thus the initial evacuation of the upstream foreline portion 35 and process chamber 15 is effected whilst maintaining a region, here the downstream foreline portion 40, within which the pressure is reduced below $P_{crit}$ to inhibit any flame front generated within the vacuum pump 20 from propagating upstream towards the process chamber 15.

Once the pressure within the upstream foreline portion 35 has reduced below $P_{crit}$, or even lower if a safety margin is to be incorporated, the isolation valve 45 is opened to establish a direct flow path of increased conductance along the foreline 30 for subsequent continued evacuation of the process chamber 15. By establishing the direct flow path for the continued evacuation, the desired vacuum within the process chamber 15 is achieved more efficiently in terms of speed of evacuation by the vacuum pump 20.

FIG. 2 illustrates a vacuum pumping arrangement comprising a second embodiment of the apparatus for inhibiting propagation of a flame front, wherein an additional valve 55, for example a variable restriction valve, is provided within bypass 50 and is controlled by signals output from the controller 25.

In operation, prior to switching on the vacuum pump 20, the isolation valve 45 and the additional valve 55 are both closed to completely isolate the process chamber 15 from the vacuum pump 20. In the event that the vacuum pump contains an accumulation of a flammable gas mixture and movement of the pumping mechanism within the vacuum pump 20 generates an ignition source, for example a spark, any flame front from a deflagration generated within the vacuum pump 20 will not be able to propagate back to the process chamber 15.

When the vacuum pump 20 is switched on, the pressure within the downstream foreline portion 40 will rapidly be reduced below $P_{crit}$, to form a barrier for inhibiting propagation of any flame front, as discussed above. The additional valve 55 is then opened by a signal output from the controller 25 to permit passage of the waste stream from the process chamber 15 through the bypass 50 to effect evacuation of the upstream foreline portion 35 and the process chamber 15. If the additional valve 55 is provided by a variable restriction valve, the flow rate of the waste stream and hence the evacuation of the process chamber can be controlled either according to a predetermined function, in response to requirements of the process or in response to monitored parameters, as discussed below in relation to FIG. 4. The flow rate through the additional valve 55 is controlled such that the pressure in the downstream foreline portion 40 is maintained below $P_{crit}$ to maintain the barrier for inhibiting propagation of any potential flame front.

As discussed above in relation to the first embodiment of the apparatus 10, evacuation is continued through bypass 50 until the pressure in the upstream foreline portion 35 is reduced below $P_{crit}$ (or below a fraction of $P_{crit}$ where a safety factor is introduced). The controller 25 then outputs a signal that causes the isolation valve 45 to open so that the conductance of the flow path through which the waste stream is drawn from the process chamber 15 into the vacuum pump 20 is increased.

The configuration of this second embodiment thereby permits complete isolation of the process chamber 15 from the vacuum pump 20 to be achieved, hence enhanced protection may be provided in circumstances where a more hazardous environment is anticipated.

Figure 3:
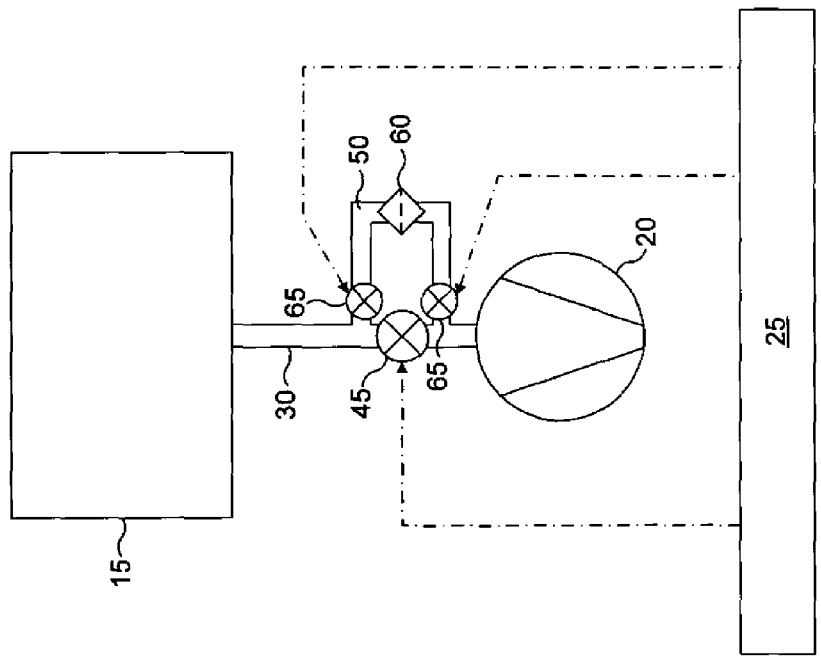
FIG. 3 illustrates a vacuum pumping arrangement comprising a third embodiment of an apparatus for inhibiting propagation of a flame front.

FIG. 3 illustrates a vacuum pumping arrangement comprising a third embodiment of the apparatus for inhibiting propagation of a flame front, in which the bypass 50 comprises a flame arrester element 60. Bypass isolation valves 65 are additionally provided to isolate the bypass 50 from the upstream and downstream foreline portions 35, 40 during the part of the evacuation in which the isolation valve 45 is open. In this embodiment, the controller 25 is configured to control the actuation of each of the valves 45, 65 by outputting respective signals thereto.

In operation, the bypass isolation valves 65 are initially opened and the isolation valve 45 is initially closed to cause the waste stream to be initially drawn from the process chamber 15 to the vacuum pump 20 through the bypass 50. If a deflagration occurs before the pressure in the upstream foreline portion 35 reduces below the $P_{crit}$ value, the flame arrester element 60 serves to inhibit propagation of the flame front towards the process chamber 15. Once the pressure within the upstream foreline portion 35 drops below $P_{crit}$ the isolation valve 45 is opened by the controller 25 to permit flow of the waste stream therethrough.

Whilst in the apparatus of FIG. 3 the bypass 50 is of similar internal cross sectional dimension to the foreline 40 it may be of reduced dimension as discussed above. Furthermore, an additional valve 55 can be provided within the bypass 50 to achieve the associated benefits described above.

In practice, depending on the particular processes being undertaken in the process chamber, the waste stream may comprise condensable or other deposit-forming species. These species cause blockage of one or more components placed within the waste stream, for example the flame arrester element 60 and/or the additional valve 55. An increased rate of deposit formation is likely to occur where these components are placed in the bypass 50 due to the slower flow rates experienced in this region. A reduced flow rate is particularly detrimental since it not only promotes the formation of pockets of increased concentration of species, but also will lack a flushing effect experienced with a higher flow rate. In the event that this type of deposit-forming species are being drawn from the process chamber 15 it is beneficial to provide bypass valves 65 which can be closed once the isolation valve 45 has been opened. In this way, the bypass 50 is not exposed to the waste stream during the bulk of the evacuation procedure where the isolation valve 45 is open.

Figure 4:
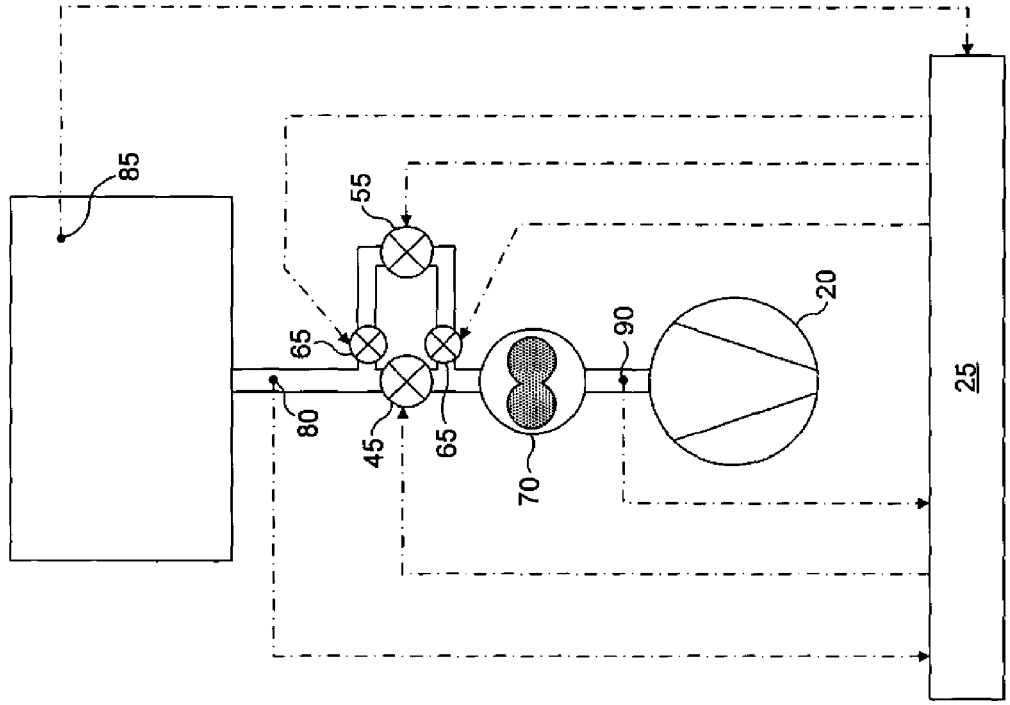
FIG. 4 illustrates an alternative vacuum pumping arrangement comprising a fourth embodiment of an apparatus for inhibiting propagation of a flame front.

FIG. 4 illustrates a vacuum pumping arrangement additionally having a booster pump 70 located between the isolation valve 45 and the vacuum pump 20. A booster pump 70 is provided to enable the vacuum pumping arrangement to reduce the pressure within the process chamber 15 below that which can be achieved by the vacuum pump 20 acting alone.

Bypass isolation valves 65 are provided as discussed in relation to FIG. 3 above. Each valve is controlled in sequence by the controller 25. One or more sensors 80, 85, 90 are provided for monitoring either the pressure at one or more locations upstream of the vacuum pump 20 or another parameter from which the pressure at any particular moment can be derived, for example temperature. Each sensor 80, 85, 90 outputs to the controller 25 a signal indicative of the respective monitored parameter. The controller 25 uses these signals to determine the timing and sequence of the actuation of each of the valves 45, 55, 65 to control the flow of the waste stream.

Potential locations for the upstream sensors 80, 85 are within the upstream foreline portion 35 or within the process chamber 15. The output from one of these sensors 80, 85 is used to determine when the pressure upstream of the isolation valve 45 falls below $P_{crit}$ so that the isolation valve 45 can be opened as soon as possible whilst the propagation of a flame front towards the process chamber 15 is inhibited. In safety critical systems, more than one sensor 80, 85 may be used to ensure that the system has in-built redundancy. A further sensor 90 may be provided in the vicinity of the vacuum pump 20 to monitor either the pressure or another parameter indicative of the pressure in or around one of the vacuum pumps 20, 70. If the pressure monitored by this sensor 90 rises above $P_{crit}$ indicating a failure within the system, the isolation valve 45 can be closed to isolate the process chamber 15 from the vacuum pumping arrangement, or other steps to mitigate a potential deflagration, such as local introduction of purge gas or termination of the supply of flammable mixture, can be initiated. In other words, sensor 90 provides a redundancy within the system to allow a fail safe apparatus to be achieved.

While the foregoing description and drawings represent the preferred embodiments of the present invention, it will be apparent to those skilled in the art that various changes and modifications may be made therein without departing from the true spirit and scope of the present invention.

I claim:

1. An apparatus comprising:
   a foreline for conveying a waste stream drawn from a process chamber to a pumping mechanism, the foreline comprising an isolation valve for selectively isolating the pumping mechanism from the process chamber and a bypass around the isolation valve; and
   a controller for actuating the isolation valve, wherein the controller is configured to:
   cause the isolation valve to be closed when the waste stream is initially drawn from the process chamber so that the waste stream is conveyed to the pumping mechanism via the bypass, the bypass comprising means for inhibiting propagation of a flame front therethrough, wherein the inhibiting means comprises valve means for effecting a variable restriction to the flow of a waste stream therethrough, wherein the controller is configured to cause the valve means to be closed prior to operation of the pumping mechanism, and opened when a pressure within a region between the valve means and the pumping mechanism has been reduced below a value at which propagation of a flame front within the waste stream can be sustained and wherein the controller is configured to prevent initiation of operation of the pumping mechanism unless the valve means is closed; and
   cause the isolation valve to be opened when a pressure within a region upstream of the isolation valve has been reduced below a value at which propagation of a flame front within the waste stream can be sustained.

2. The apparatus according to claim 1 wherein an internal dimension of the bypass is smaller than that of the foreline to restrict flow of a waste stream therethrough.

3. The apparatus according to claim 1 wherein the inhibiting means comprises a flame arrester element.

4. The apparatus according to claim 1 wherein the isolation valve comprises a gate valve.

5. A method comprising:
   providing a foreline for conveying a waste stream drawn from a process chamber to a pumping mechanism, the foreline comprising an isolation valve for selectively isolating the pumping mechanism from the process chamber and a bypass around the isolation valve;

providing a controller for controlling the isolation valve;

closing the isolation valve with the controller when the waste stream is initially drawn from the process chamber so that the waste stream is conveyed to the pumping mechanism via the bypass, the bypass comprising means for inhibiting propagation of a flame front therethrough; and opening the isolation valve with the controller when a pressure within a region upstream of the isolation valve has been reduced below a value at which propagation of a flame front within the waste stream can be sustained by monitoring the pressure directly and opening the isolation valve in dependence on the monitored pressure.

6. The method according to claim 5 wherein an evacuated region is generated as the waste stream is drawn through the bypass.

7. The method according to claim 6 wherein the evacuated region is generated between the pumping mechanism and the isolation valve.

8. The method according to claim 5 wherein the method comprises the further steps of:

providing a further isolation valve in the bypass;

closing the further isolation valve prior to operation of the pumping mechanism; and opening the further isolation valve when a pressure within a region between the further isolation valve and the pumping mechanism has been reduced below a value at which propagation of a flame front within the waste stream can be sustained.

9. A method comprising:

providing a foreline for conveying the waste stream drawn from the process chamber to the pumping mechanism, the foreline comprising an isolation valve for selectively isolating the pumping mechanism from the process chamber and a bypass around the isolation valve;

providing a controller for controlling the isolation valve;

closing the isolation valve with the controller when the waste stream is initially drawn from the process chamber so that the waste stream is conveyed to the pumping mechanism via the bypass, the bypass comprising means for inhibiting propagation of a flame front therethrough; and opening the isolation valve with the controller when a pressure within a region upstream of the isolation valve has been reduced below a value at which propagation of a flame front within the waste stream can be sustained wherein opening the isolation valve comprises:

monitoring a parameter indicative of the pressure;

determining the pressure from the monitored parameter; and opening the isolation valve in dependence on the determined pressure.

10. The method according to claim 9 wherein an evacuated region is generated as the waste stream is drawn through the bypass.

11. The method according to claim 10 wherein the evacuated region is generated between the pumping mechanism and the isolation valve.

12. The method according to claim 9 wherein the method comprises the further steps of:

providing a further isolation valve in the bypass;

closing the further isolation valve prior to operation of the pumping mechanism; and opening the further isolation valve when a pressure within a region between the further isolation valve and the pumping mechanism has been reduced below a value at which propagation of a flame front within the waste stream can be sustained.

\* \* \* \* \*